Sept. 30, 1930.   L. DE FOREST   1,777,037
BINAURAL RECORDING AND REPRODUCING SOUND
Original Filed Nov. 27, 1926
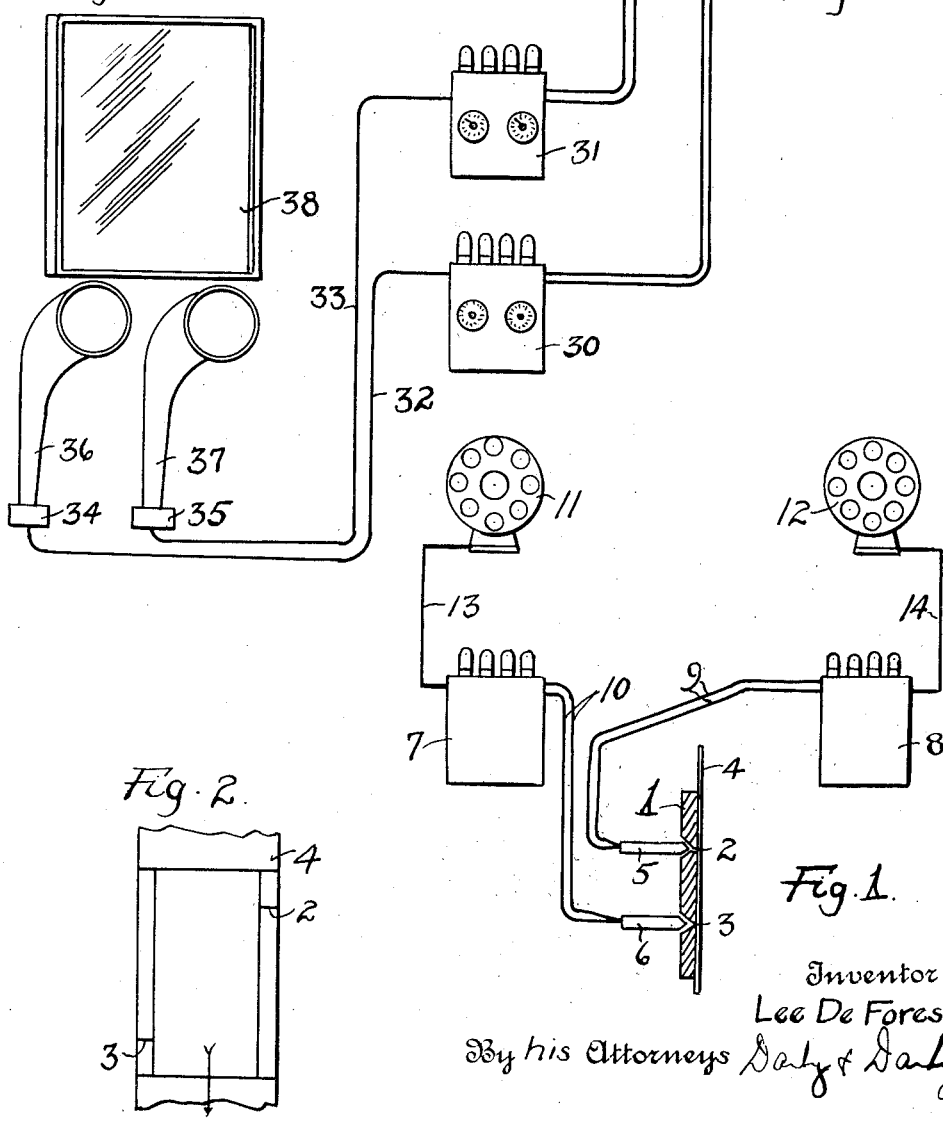

Patented Sept. 30, 1930

1,777,037

UNITED STATES PATENT OFFICE

LEE DE FOREST, OF NEW YORK, N. Y., ASSIGNOR TO DE FOREST PHONOFILM CORPORATION, OF NEW YORK, N. Y., A CORPORATION OF DELAWARE

BINAURAL RECORDING AND REPRODUCING SOUND

Original application filed November 27, 1926, Serial No. 151,170. Divided and this application filed August 4, 1928. Serial No. 297,507.

This invention relates in general to talking motion pictures.

One of the objects of this invention is the provision of a new and novel apparatus for the reproduction of sounds in connection with motion pictures which are a faithful reproduction of the original sounds from which they are made.

Another object of this invention is the provision of a new and novel apparatus by means of which several sound records from the same source may be simultaneously recorded on the same or separate film negatives.

Another object of this invention is the construction of a single positive from this negative having thereon the two sound records in superimposed position and of a different color.

A further object of this invention is the provision of a new and novel arrangement of devices by means of which the sound may be reproduced at a plurality of points from the above described composite film.

A still further object of this invention is the provision of sound reproducing apparatus of this nature in which two photo-electric cells sensitive to light waves of different wave lengths are exposed to the light of different wave lengths coming from such a composite film.

A further object of this invention is to provide apparatus which is adapted to selectively disassociate the sound records on such a composite film, so as to make them available for actuating photo-electric cells sensitive to light of the wave lengths of the light disassociated.

This application is a division of my copending application Serial No. 151,170, filed November 27, 1926.

These and many other objects are successfully sought through the agency of the method and apparatus to be described hereinafter.

This invention resides substantially in the combination, construction, arrangement and relative location of parts or steps, as will be more clearly understood from the following specification and drawings.

Referring to the drawings in which the same reference numerals will be used for parts in the different views to indicate the same or similar parts.

Figure 1 is a diagrammatic view with the film gate in vertical cross-section of the apparatus for recording sound;

Fig. 2 is a front elevational view of a film on which the two records from the same source are to be recorded simultaneously showing the relation of the recording film slits with respect to the film;

Fig. 3 is a diagrammatic view showing the film cut partly in cross-section of apparatus employed by me for the reproduction of sound; and Fig. 4 is a side elevational view of a composite film having the two superimposed sound records thereon.

In my copending application Serial No. 121,679, filed July 10, 1926, I have disclosed a system for recording simultaneously two distinct sound records from the same source and reproducing each by means of loud speaking devices located at different points with respect to a motion picture screen. The sound records which are simultaneously recorded from the same source of sound are made from apparatus employing a microphone for each record located at different points with respect to the same source of sound. In that system two sound records are photographically recorded on the same strip of film, one for each source, using distinct microphones, two amplifiers, and two sources of variable light; and in reproducing two sources of light and two photoelectric cells each with its own amplifier and loud speaker. As stated above, these loud speakers are arranged relative to the screen in positions corresponding in a manner to the original location of the two microphones with respect to the sound source.

The method there described requires two distinct sound records, preferably arranged, one on either side of the motion picture film.

In the present apparatus I employ a single composite film comprising two separate positives, each having thereon a separate sound record made from the same source, thereby obtaining the benefits of so-called bin-aural reproduction without encroaching upon the space of the film reserved for the picture in any greater degree than is at present required for the single sound record.

It has been known that two sets of photographs can be printed on the same strip in different colors, for example in red and blue—one on one side of the film and one on the other side, or both on the same side of the film, one color picture being superimposed upon the other. I utilize this principle in recording two sound records on the same strip, one in red and one in blue.

Referring to the drawings, there is shown in Fig. 1 at 1, a film gate having two fine slits 2 and 3 therein past which there is adapted to be moved a motion picture film 4 in close proximity thereto. Mounted directly in back of the slits 2 and 3 are the light sources 5 and 6, which are respectively connected by means of the wires 9 and 10 to any suitable current amplifying devices 7 and 8, respectively. As one form of amplifier suitable for this purpose, I have indicated by the drawings a vacuum tube type. The amplifiers 7 and 8 are connected, respectively, by means of cables 13 and 14 to the sound sensitive device or microphones 11 and 12. It will be apparent from this drawing and description when the microphones 11 and 12 are placed at the proper distance and at different points with respect to the same source that each light source will receive substantially the same currents representing the sounds from this source, but they will have some differences due to the spacial relation which they bear to the sound source.

It is important to note that the two slits 2 and 3 are not in vertical alignment with each other as will be apparent upon examination of Fig. 2. The two slits have been indicated by the black lines 2 and 3 on each side of the film 4 so that the sound record will be made along each marginal edge of the film. For clarity, it may be stated again that these sound records will vary somewhat due to their different position of their respective microphones, with respect to the sound source. While I have shown the sound records applied to the marginal edges of the film 4 it will be apparent there would be no substantial deviation from this invention by recording them at other points on the film 4, or even on separate films.

It will be apparent that this apparatus is essentially adapted for recording sounds which emanate from a number of separated sources. Thus, for instance, when recording music from a large orchestra it will be possible to get an approximately faithful record of all the instruments in the orchestra by employing two microphones. It is, of course, evident that a plurality of microphones could be utilized, and for instance, two microphones could be substituted for the microphone 11, or likewise two microphones for the microphone 12, the four microphones being differently placed with respect to the orchestra to get an even greater fidelity of recordation.

The two sound records on the film 4 are printed, each on separate positives, so that one positive carries the record made through the slit 2 and the other the record made through the slit 3.

While I do not desire to be limited to the particular point on the films where the records are printed, I have found that it is preferable to record them at one of the marginal edges thereof. It is important to note that these sound records are printed on their positives, so that when one is superimposed over the other, the two sound records may be juxtapositioned or juxta-opposed, so that one lies directly above the other and not on opposite sides of the final positive, as was the case with the original negative. One of these positives is then dyed one color and the other is dyed another. For instance, one may be dyed blue and the other red. The two dyed positives are then cemented together in such a manner that the red sound record lies exactly over the blue sound record in the manner indicated above. I have shown such a double positive in Fig. 4, in which the two films cemented together have been indicated at 15 and 16, it being intended that 15 represents the film which lies in back of film 16. Thus, as described, the film 15 would have the red sound record thereon.

For reproducing sound from such a composite record I employe an apparatus of the type described in Fig. 3. At 17 and 18 are illustrated two constant light sources, such as incandescent lamps. The light from these sources is transmitted through the lenses 19 and 20, respectively, and the fine slits 22 and 23 of the film gate 21. The composite film 15 and 16 moves over the surface of the gate, as shown in close proximity thereto. The light from the two sources 17 and 18 pass through the colored filters 24 and 25, respectively. The colored filter in front of the slit 22 is a red light filter, which, as will be readily understood, transmits light in the wave lengths representing the red light, and the filter 25 in front of the slit 23 is a blue filter which transmits or permits only blue light to pass. The red light transmitted by the filter 24 impinges upon a photo-electric cell of the thalofide type 26, which is especially sensitive to red or infra-red light. The blue light which is transmitted by the filter 25 falls upon a photo-electric cell of the potassium mirror type 27, which is sensitive to green, blue or ultra-violet light. As is clearly shown, the photo-electric cell 26 is connected by means of the wire 28 to a vacuum tube amplifier 20, and the electric cell 27 is likewise connected by means of the wires 29 to a similar vacuum tube amplifier 31. As I stated in connection with the amplifiers 7 and 8, it will be apparent that the amplifiers 30 and 31 may be of any suitable form, and those disclosed by me in a diagrammatic sense are only to be taken as illustrative.

The cables 32 and 33 from the amplifiers 30 and 31, respectively, are connected to the electromagnetic sound reproducing units 34 and 35 of the loud speaking horns 36 and 37, as shown. These horns are disposed with respect to the motion picture screen 38 in the manner best suited to produce the effect that the sound is emanating from two or more sources simulating the original sound sources.

I have indicated in Fig. 4, at 40 on the composite film 15, 16, the sound record which is composed of the two separate sound records, as previously described, including red and blue markings. In the reproducing apparatus the disposition of the slits 22 and 23 are shown on Fig. 4 by the short heavy black lines, also represented by the references 22 and 23.

It may be noticed that in this apparatus, as opposed to the recording apparatus of Fig. 1, the two slits 22 and 23 are in vertical alignment and displaced vertically with respect to each other a distance equal to the vertical displacement between the two slits 2 and 3 so that the sounds represented by the red and blue records will be simultaneously reproduced by the horns 36 and 37. It hardly need be stated here that if desired more than two loud speaking devices may be utilized and disposed at any suitable points with respect to the screen 38.

By this arrangement each loud speaker will reproduce only the sound which is represented by one of the sound records on the composite film. It will also be evident that I have provided apparatus for selectively disassociating the two different colored superimposed sound records which are on the composite film 15 and 16, so that the two photo-electric cells sensitive to light of different wave lengths may be simultaneously and individually actuated.

It will be readily apparent to those who are skilled in this art that there are many changes in the details of construction and relative arrangement of parts, as well as in the steps of the method and relative arrangement, which will readily occur to them, and I do not, therefore, desire to be particularly limited to the exact disclosure which I have presented in this specification and drawings, for the purpose of illustrating the principles of my invention. I desire only to be limited to the scope of my invention, as I have defined it in the appended claims.

What I seek to secure by United States Letters Patent is:

1. Apparatus for the bin-aural reproducing of sound comprising a film having differently colored sound records thereon superimposed one on the other and longitudinally spaced apart one with respect to the other placed between sources of light and light actuated cells sensitive to different wave lengths and means separately actuated by the currents generated in each of said cells for producing sound.

2. In sound reproducing apparatus, the combination with two photo-electric cells having different color response characteristics, two light sources, a film having thereon two superimposed longitudinally spaced apart differently colored sound records, a film gate having two longitudinally spaced apart slits thereon between said sources and cells, a light filter between each slit and cell for transmitting light of a different wave length, of a separate sound reproducing device connected to each cell.

3. The combination of a sound photographic film having separate and different sound records superimposed one on the other, but longitudinally displaced one with respect to the other, and separate longitudinally separated means for reproducing the sounds from each of said records without interference one from the other.

4. In a bin-aural sound reproducing apparatus the combination comprising a film having two superimposed, distinct sound records of different colors linearly displaced, light sources on one side of the film, so the light therefrom shines through said records, slit forming member between the light sources and the film, light sensitive cells, color filters between the film and cells and a separate sound reproducing device connected to each cell.

5. In sound reproducing apparatus, the combination with two photo-electric cells each of which respond differently to different colors, two light sources, a film having thereon two differently colored sound records superimposed one on the other, a film gate having two longitudinally spaced apart slits thereon between said sources and cells, a light filter between each slit and cell for transmitting light of a different wave length, and a separate sound reproducing device connected to each cell.

In testimony whereof I have hereunto set my hand on this 27th day of July A. D. 1928.

LEE DE FOREST.